US012536352B2

(12) United States Patent
Wang et al.

(10) Patent No.: US 12,536,352 B2
(45) Date of Patent: Jan. 27, 2026

(54) REALISTIC PLANT GROWTH MODELING

(71) Applicant: Deere & Company, Moline, IL (US)

(72) Inventors: Kangkang Wang, San Jose, CA (US);
Bodi Yuan, Sunnyvale, CA (US);
Zhiqiang Yuan, San Jose, CA (US);
Hong Wu, Los Altos, CA (US); Daniel
Ribeiro Silva, San Jose, CA (US);
Zihao Li, San Jose, CA (US)

(73) Assignee: Deere & Company, Moline, IL (US)

( * ) Notice: Subject to any disclaimer, the term of this
patent is extended or adjusted under 35
U.S.C. 154(b) by 816 days.

(21) Appl. No.: 17/307,849

(22) Filed: May 4, 2021

(65) Prior Publication Data
US 2022/0358265 A1    Nov. 10, 2022

(51) Int. Cl.
G06F 30/27     (2020.01)
G06N 3/045     (2023.01)
G06T 17/00     (2006.01)

(52) U.S. Cl.
CPC ............. G06F 30/27 (2020.01); G06N 3/045
(2023.01); G06T 17/00 (2013.01)

(58) Field of Classification Search
CPC ..... G06F 30/27; G06F 2123/00; G06N 3/045;
G06N 3/0442; G06N 3/0475; G06N 3/09;
(Continued)

(56) References Cited
U.S. PATENT DOCUMENTS 10,568,316 B2 *   2/2020  Gall .................... G01N 21/4738
11,113,525 B1 *   9/2021  Li ......................... G06N 3/088
(Continued)

FOREIGN PATENT DOCUMENTS

CN    102254344 A  *  11/2011
CN    104965586 A  *  10/2015
(Continued)

OTHER PUBLICATIONS

Nan An et al.; "Quantifying time-series of leaf morphology using 2D and 3D photogrammetry methods for high-throughput plant phenotyping"; Computers and Electronics in Agriculture 135 (2017) 222-232 (Year: 2017).*

(Continued)

Primary Examiner — Rehana Perveen
Assistant Examiner — Nupur Debnath
(74) Attorney, Agent, or Firm — HANLEY, FLIGHT & ZIMMERMAN, LLC

(57) ABSTRACT

Implementations are described herein for realistic plant growth modeling and various applications thereof. In various implementations, a plurality of two-dimensional (2D) digital images that capture, over time, one or more of a particular type of plant based on one or more machine learning models to generate output, may be processed. The output may be analyzed to extract temporal features that capture change over time to one or more structural features of the particular type of plant. Based on the captured temporal features, a first parameter subspace of whole plant parameters may be learned, wherein the whole plant parameters are usable to generate a three-dimensional (3D) growth model that realistically simulates growth of the particular type of plant over time. Based on the first parameter subspace, one or more 3D growth models that simulate growth of the particular type of plant may be non-deterministically generated and used for various purposes.

20 Claims, 7 Drawing Sheets

(58) Field of Classification Search
CPC .................... G06N 3/094; G06T 17/00; G06T 2207/20081; G06T 13/60; G06T 7/20; G06V 10/82; G06V 20/188; G06V 20/20; G06V 20/64

See application file for complete search history.

(56) References Cited

U.S. PATENT DOCUMENTS

| | | | | |
|---|---|---|---|---|
| 2018/0330166 | A1* | 11/2018 | Redden | G06V 20/188 |
| 2019/0200535 | A1* | 7/2019 | Regan | A01G 7/00 |
| 2020/0286282 | A1* | 9/2020 | Grant | G06V 20/647 |
| 2020/0401883 | A1* | 12/2020 | Yang | G06T 7/001 |
| 2023/0026679 | A1* | 1/2023 | Matarazzo | B64C 39/024 |

FOREIGN PATENT DOCUMENTS

| | | | | |
|---|---|---|---|---|
| CN | 104965586 B | * | 10/2015 | |
| CN | 105373088 A | * | 3/2016 | |
| CN | 109870118 A | * | 6/2019 | |
| CN | 209512786 U | * | 10/2019 | |
| CN | 111163628 A | * | 5/2020 | ........... A01M 7/0089 |
| CN | 109870118 B | * | 9/2020 | |
| CN | 112509129 A | * | 3/2021 | ........... G06K 9/6215 |
| CN | 112990262 A | * | 6/2021 | ........... G06K 9/6267 |
| JP | 2020140347 A | * | 9/2020 | |
| JP | 7176980 B2 | * | 11/2022 | |

OTHER PUBLICATIONS

Harold F. Murcia et al.; "Development of a Simulation Tool for 3D Plant Modeling based on 2D LiDAR Sensor"; 2020 Virtual Symposium in Plant Omics Sciences (OMICAS) (Year: 2020).*

Martinez-Guanter et al.; "Low-Cost Three-Dimensional Modeling of Crop Plants"; (Year: 2019).*

Robail Yasrab et al.; "Predicting Plant Growth from Time-Series Data Using Deep Learning"; Remote Sens. 2021, 13, 331 (Year: 2021).*

Stefan Paulus; "Measuring crops in 3D: using geometry for plant phenotyping"; Paulus Plant Methods (2019) 15:103 (Year: 2019).*

Barczi et al., "AmapSim: A Structural Whole-plant Simulator Based on Botanical Knowledge and Designed to Host External Functional Models" Annals of Botany 101: 1125-1138, doi:10.1093/aob/mcm194. Oxford Journals. 2008. 14 pages.

Lucic et al., "Are GANs Created Equal? A Large-Scale Study" arXiv:1711.10337v4 [stat.ML] dated Oct. 29, 2018. 21 pages.

Bailey, "Helios: A Scalabel 3D Plant and Environmental Biophysical Modeling Framework" Frontiers. doi: 10.3389/fpls.2019.01185. dated Oct. 28, 2019. 17 pages.

Santos et al., "Image-based 3D digitizing for plant architecture analysis and phenotyping" Brazilian Agricultural Research Corporation. dated Oct. 25, 2018. 9 pages.

An et al., "Quantifying Time-series of Leaf Morphology Using 2D and 3D Photgrammetry Methods for High-throughput Plant Phenotyping" Elsevier. available at https://www.elsevier.com/open-access/userlicense/1.0/ dated 2019. 35 pages.

Prusinkiewicz, "Modeling of spatial structure and development of plants: a review" Elsevier. Scientia Horticulturae 74 (1998) 113-149. Dated Oct. 8, 1997. 37 pages.

Visser et al., "3D modelling of plants: a review" Plant Research International. Dated Nov. 2002. 44 pages.

* cited by examiner

REALISTIC PLANT GROWTH MODELING

BACKGROUND

Classification of whole plants and individual plant parts in digital imagery has numerous applications, including but not limited to weed detection, crop yield prediction, and disease diagnosis, to name a few. Various types of machine learning models can be trained to segment and/or recognize various types of plants in digital images. Convolutional neural networks are one popular example. However, the accuracy of these machine learning models depends largely on the amount of training data used to train them. Annotating training images can be prohibitively costly, especially where the images are annotated on a pixel-wise basis. Moreover, images of particular plants may not be as widely available or easily acquired as necessary to train a sufficiently accurate machine learning model.

SUMMARY

Implementations are described herein for realistically modelling plant growth for various purposes, such as automatically generating two-dimensional (2D) synthetic training images that are usable as training data for training machine learning models to detect, segment, and/or classify various types of plants and/or constituent structural features of plants in digital images. More particularly, but not exclusively, techniques are described herein for observing ground truth growth patterns among multiple instances of a particular type of plant, and leveraging these ground truth growth patterns to non-deterministically generate three-dimensional (3D) synthetic plant growth models that realistically simulate growth of the particular type of plant over time. These 3D synthetic plant growth (or "organogenesis") models may then be used for various purposes, such as to generate myriad temporal sequences of 2D synthetic training images that also realistically portray the growth of the particular type of plant. Annotation of these 2D synthetic training images can be performed automatically as part of the generation process, even at a per-pixel level, significantly reducing or eliminating the costs associated with creating annotated training data from real-life digital images.

In various implementations, one or more temporal sequences of ground truth plant imagery may be processed to detect instances of a particular type of plant, such as a raspberry or sugar beet plant, as well as the plant's constituent structural features/parts, such as leaves, flowers, branches, stems, fruit, or petioles, to name a few. These temporal sequences may include videos (time lapse or otherwise) taken of individual plants and/or images captured over time by agricultural personnel and/or robots, e.g., while they travel through fields performing other agricultural tasks. Additionally or alternatively, in some implementations, these temporal sequences of plant imagery may include 3D point clouds that may be constructed, for instance, from ground truth 2D imagery (e.g., the examples described previously) using techniques such as structure from motion (SFM). In some implementations, additional data about plant growth may also be used, such as average of and/or variance among plant heights across multiple plants of the particular type over time, averages and/or variances of number of leaves across multiple plants of the particular type over time, etc. This additional data about plant growth across multiple plants of the particular may be observed by agricultural personnel and/or by robots. In some implementations, the processing may include application of machine learning models, such as CNNs, to detect and annotate instances of the particular type of plant and/or its constituent structural features.

The output of the analysis—which may include annotations indicative of detected plants and plant structural parts as well as temporal aspects of the images themselves (e.g., timestamps, image metadata indicative of a time the images were captured)—may be analyzed to extract various temporal features about the particular type of plant. These temporal features may include, for instance, changes over time to one or more structural features of the particular type of plant. Some non-limiting examples of temporal features include one or more time intervals to develop one or more of the structural features of the particular type of plant, such as a time interval for a flower to develop into a fruit, a time interval to develop a first (or second, or third, . . . ) leaf, a time interval to develop a first (or second, or third, . . . ) flower, a time interval to develop a first (or second, or third, . . . ) branch, etc. In some implementations, the temporal features may include a time interval for one of the structural features to grow from a first size to a second size, or a ratio of multiple time intervals, such ratio between a time interval for a flower to develop into a fruit and a second time interval for the fruit to fall off the plant or become overripe.

The extracted temporal features may be analyzed, e.g., in conjunction with environmental time series data for the area in which the 2D images were captured, to identify various correlations and learn one or more parameter subspaces of the particular type of plant as a whole and/or one or more constituent structural features of the particular type of plant. These parameter subspace(s) may capture, e.g., statistically, regressively, etc., the various temporal features described above, as well as correlations with environmental data. As used herein, the terms "feature" and "parameter" may both refer to an aspect of a plant. The term "feature" will be used primarily to refer to observed instances of the aspect of the plant (e.g., an observed time for a plant to develop its first leaf). By contrast, the term "parameter" will be used primarily to refer to the same aspect of the plant that is sampled (e.g., non-deterministically) when generating a 3D synthetic plant growth model. Thus, in some cases, the terms "feature subspace" and "parameter subspace" may be roughly synonymous.

In some implementations, the learning of the parameter subspace(s) may include applying techniques such as linear or non-linear dimensionality reduction to learn a mapping between a higher dimension space (e.g., a space that includes a superset of observable features of multiple types of plants) and a lower dimension subspace (e.g., a subspace that includes a subset of features observed/inferred for a particular type of plant as a whole and/or for its constituent structural features). In some implementations, the lower dimension subspace may be defined as a manifold, although this is not required. In some implementations, a generator and/or discriminator of a generative adversarial network (GAN) may be applied to search and validate parameters of one or more of the parameter subspaces. In other implementations, a time series machine learning model such as a recurrent neural network, a long short-term memory (LSTM) network, a gated recurrent unit (GRU) network, etc., may be jointly trained on the temporal features and time series environmental data to learn the correlations, and hence, the parameter subspace(s).

The one or more learned parameter subspaces may then be leveraged to non-deterministically generate 3D synthetic plant growth models that correspond to the ground truth growth observed in the real life plants. Various aspects of each 3D synthetic plant growth model, including but not limited changes over time to leaf shapes/contours, leaf sizes, leaf textures, height, leaf counts, flower/fruit counts/sizes, branch counts/sizes, etc., may be sampled, at least in part, randomly, stochastically, and/or non-deterministically, from one or more of the learned parameter subspaces. Because these temporal parameters (which may correspond to the "temporal features" described previously) are sampled from a parameter subspace that is learned ground truth observations, the resulting 3D plant growth models may simulate highly realistic plant growth.

In some implementations, these 3D synthetic plants may then be graphically incorporated into 2D temporal synthetic training data. In some implementations, each instance of the 2D temporal synthetic training data may take the form of a ground truth "palette"—e.g., a digital image of an environment such as a fields with or without plants—with an instance of a 3D synthetic plant graphically incorporated, e.g., by flattening, superimposing, and/or projecting the 3D synthetic plant onto the 2D palette. In some implementations, the 2D synthetic training data may be entirely computer-generated, both plants and underlying ground surface. In either case, the resulting 2D synthetic training image(s) may then be used to train machine learning models to perform a variety of agricultural tasks relating to the same types of plants that are represented by the 3D synthetic plants, such as plant detection, disease diagnosis, yield prediction, etc.

Synthetic training data generated using techniques described herein are not limited to plants generated with 3D growth models. In some implementations, certain types of plants, such as weeds, may be grown in a controlled environment, such as a small plot in which they are spaced apart from each other. 2D digital images may be captured of these plants, e.g., from overhead or from another angle. A learning-based mask extraction process may then be implemented in which these digital images are processed, e.g., using a weed mask that is developed to detect and extract the particular type of weed. These extracted 2D plants may be overlaid onto synthetic training images that also include plants generated using 3D growth models as described herein. Extracting 2D plants and overlaying them in images may be less expensive computationally than generating full 3D growth models, thus providing a faster, lighter, and/or complementary approach to 3D simulated plant modeling. In various implementations, these 2D overlaid plants may be spaced and/or lighted in accordance with the environmental conditions in the area depicted in the synthetic training data.

In some implementations, a method may include: processing a plurality of two-dimensional (2D) digital images that capture, over time, one or more of a particular type of plant based on one or more machine learning models to generate output; analyzing the output to extract temporal features that capture change over time to one or more structural features of the particular type of plant; analyze the extracted temporal features and temporally corresponding time series environmental data associated with one or more geographic areas in which the 2D digital images were captured to identify one or more correlations; based on the captured temporal features and one or more of the correlations, learning a first parameter subspace of whole plant parameters that are usable to generate a three-dimensional (3D) growth model that simulates growth of the particular type of plant over time; and based on the first parameter subspace, non-deterministically generating one or more 3D growth models that simulate growth of the particular type of plant.

In various implementations, the method may further include graphically incorporating one or more of the 3D growth models of the particular type of plant into 2D temporal synthetic training data; and training one or more of the same machine learning models or one or more different machine learning models based on the 2D temporal synthetic training data. In various implementations, the 2D temporal synthetic training data may include one or more 2D training images that each captures a ground truth environment, and wherein each of the 2D training images includes one or more superimposed instances of one or more of the 3D growth models of the particular type of plant.

In various implementations, the method may further include analyzing the output to detect one or more constituent plant parts in the plurality of 2D digital images; generating a respective temporal sequence of 3D point clouds for each of the one or more detected constituent plant parts, wherein each of the respective temporal sequences of 3D point clouds captures growth of the corresponding constituent plant part over time; and based on the respective temporal sequence of 3D point clouds, learning a second parameter subspace of plant part parameters that are usable to simulate growth of 3D growth models of the constituent plant part over time.

In various implementations, the analyzing may include detecting one or more growth time intervals of one or more of the structural features of the particular type of plant. In various implementations, the one or more structural features may include one or more of leaves, flowers, branches, stems, fruit, or petioles. In various implementations, the one or more time growth time intervals may include a growth time interval for a flower to develop into a fruit. In various implementations, the one or more growth time intervals include a time interval for one of the structural features to grow from a first size to a second size.

In various implementations, the plurality of 2D digital images may include one or more videos, with each of the one or more videos capturing a distinct instance of the particular type of plant. In various implementations, the learning may include applying a generator and discriminator of a generative adversarial network (GAN) to search and validate parameters of the first parameter subspace.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
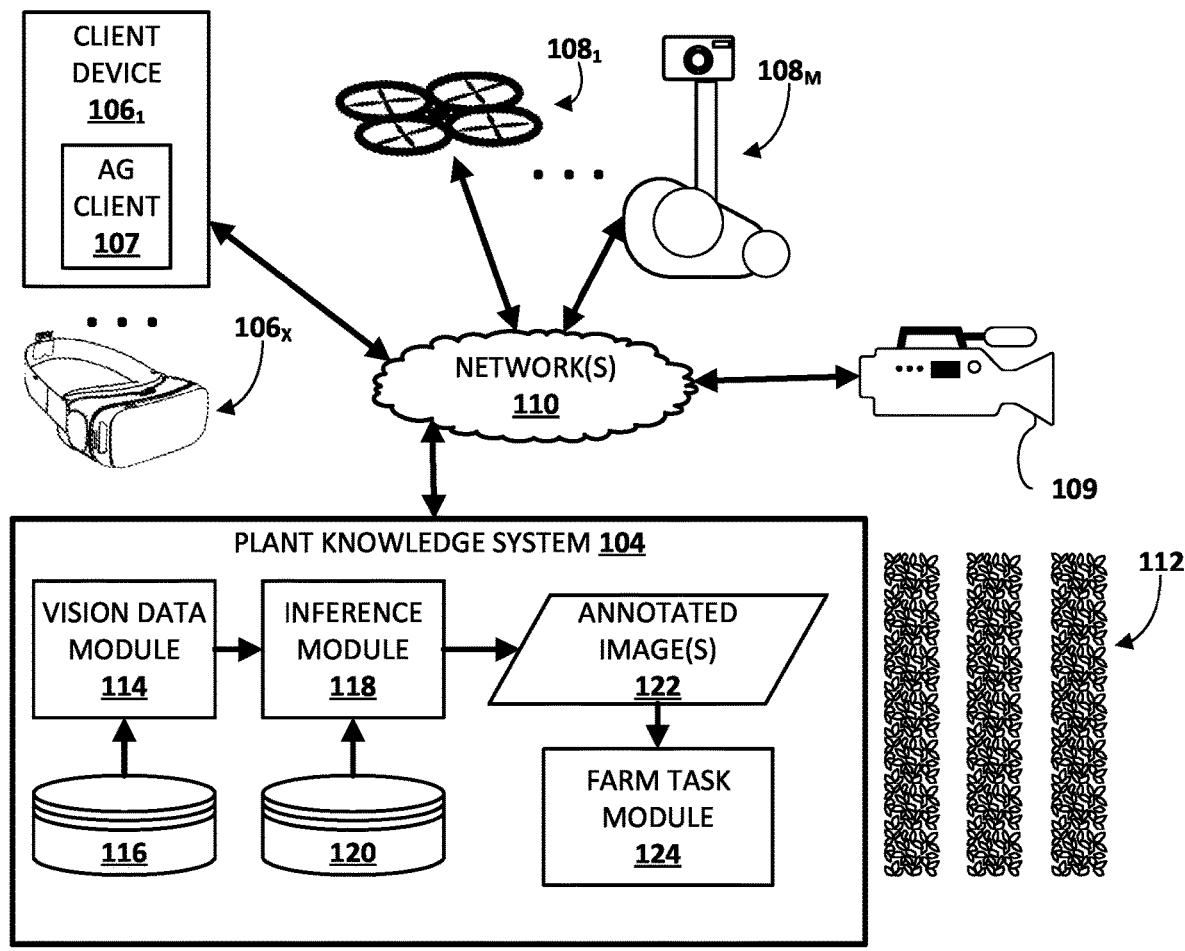
FIG. 1 schematically depicts an example environment in which selected aspects of the present disclosure may be employed in accordance with various implementations.

FIG. 1 schematically illustrates an environment in which one or more selected aspects of the present disclosure may be implemented, in accordance with various implementations. The example environment includes one or more agricultural areas 112 and various equipment that may be deployed at or near those areas, as well as other components that may be implemented elsewhere, in order to practice selected aspects of the present disclosure. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc.

Agricultural area(s) 112 may be used to grow various types of crops that may produce plant parts of economic and/or nutritional interest. Agricultural area(s) 112 may include, for instance, one or more crop fields, one or more plots, one or more gardens, one or more greenhouses, or any other areas in which there may be an interest or desire to automatically detect, classify, and/or segment particular types of plants. Plants that are captured in digital imagery and analyzed using techniques described herein may take any form depending on the circumstances. Some plants may be considered desirable, and may include, for instance, strawberry plants, raspberries, sugar beets, soybeans, beans, corn, cabbage, lettuce, spinach, wheat, berries, etc. Other plants may be considered undesirable (e.g., weeds), and may include, for instance, dandelions, waterhemp, giant ragweed, marestail (also commonly known as horseweed), common lambsquarters, common groundsel, field pansy, mayweed or dog fennel, pineapple-weed or chamomile, several pigweeds, and white campion, yellow woodsorrel, yellow nutsedge, etc.

An individual (which in the current context may also be referred to as a "user") may operate one or more client devices $106_{1-X}$ to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") $106_X$ that provides an AR or VR immersive computing experience, a "smart" watch, and so forth. Additional and/or alternative client devices may be provided.

Plant knowledge system 104 is an example of an information system in which the techniques described herein may be implemented. Each of client devices 106 and plant knowledge system 104 may include one or more memories for storage of data and software applications, one or more processors for accessing data and executing applications, and other components that facilitate communication over a network. The operations performed by client device 106 and/or plant knowledge system 104 may be distributed across multiple computer systems.

Each client device 106 may operate a variety of different applications that may be used to perform various agricultural tasks, such as crop yield prediction, plant-part-of-interest inventory, crop disease diagnosis, etc. For example, a first client device $106_1$ operates agricultural ("AG") client 107 (e.g., which may be standalone or part of another application, such as part of a web browser). Another client device $106_X$ may take the form of a HMD that is configured to render 2D and/or 3D data to a wearer as part of a VR immersive computing experience. For example, the wearer of client device $106_X$ may be presented with 3D point clouds representing various aspects of objects of interest, such as fruits of crops, weeds, crop yield predictions, etc. The wearer may interact with the presented data, e.g., using HMD input techniques such as gaze directions, blinks, etc.

In some implementations, AG client 107 may be used to communicate to agricultural personnel instructions and/or information that can help them perform various agricultural tasks. For example, a farm task module 124 (described in more detail below) may generate a report, a map, instructions, and/or any other data that may be presented to an operator of a client device 106 using a graphical user interface, audibly, etc. These data may inform the agricultural personnel where targeted plants—e.g., weeds, crops ready to be harvested, diseased crops, underperforming or over-performing crops, pest-infested crops, etc.—are located, what action(s) should be taken on those plants, a timeframe in which those action(s) should be taken, etc.

In some implementations, one or more robots $108_{1-M}$ may be deployed to perform various agricultural tasks. Performance of some of these tasks may be performed using machine learning model(s) trained on synthetic training data created using techniques described herein. An individual robot $108_{1-M}$ may take various forms, such as an unmanned aerial vehicle $108_1$, a robot (not depicted) that is propelled along a wire, track, rail or other similar component that passes over and/or between crops, a wheeled robot $108_M$, or any other form of robot capable of being propelled or propelling itself past crops of interest.

In some implementations, different robots may have different roles, e.g., depending on their capabilities. For example, in some implementations, one or more of robots $108_{1-M}$ may be designed to capture data, others may be designed to manipulate plants or perform physical agricultural tasks, and/or others may do both. Robots 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, lasers, barometers (for local weather information), photodiodes (e.g., for sunlight), thermometers, etc.

The data capture role played by robots $108_{1-M}$ in area 112 over time is particularly relevant to the present disclosure. Digital imagery acquired over time by one or more of the aforementioned robot sensors may capture change over time to one or more structural features of particular types of plants. For example, if a single type of plant is grown in area 112, then changes to those homogenous plants may be captured in digital imagery acquired by robots $108_{1-M}$ over time as they perform their various tasks. In some implementations, 2D imagery captured by robots $108_{1-M}$ may be used to construct 3D models, such as 3D point clouds, of whole plants and/or constituent structural features of plants. In some such implementations, techniques such as structure from motion (SFM) may be applied to construct the 3D models.

Additionally or alternatively, in some implementations, temporal sequences of digital images (e.g., videos, including but not limited to time lapse videos) that record growth of individual instance(s) of a particular type of plant over time may be obtained using, for instance, a camera 109 that remains focused on those individual instance(s) of the particular type of plant while they grow.

In various implementations, plant knowledge system 104 may be implemented across one or more computing systems that may be referred to as the "cloud." Plant knowledge system 104 may receive vision data generated by robots $108_{1-M}$, video camera 109, and any other sources of digital imagery capturing instances of a particular type of plant, and process it using various image processing techniques to perform tasks such as plant detection, classification, and/or segmentation. In various implementations, plant knowledge system 104 may include a vision data module 114 and an inference module 118. In some implementations one or more of modules 114 and 118 may be omitted, combined, and/or implemented in a component that is separate from plant knowledge system 104.

Plant knowledge system 104 may also include one or more databases. For example, plant knowledge system 104 may include, in communication with vision data module 114, an imagery database 116 for storing image data captured by, for instance, agricultural personnel, one or more robots $108_{1-M}$, and/or video camera 109. Plant knowledge system 104 may also include a machine learning model database 120 that includes one or more machine learning models that may or may not be trained based on synthetic training data generated using techniques described herein. In this specification, the term "database" and "index" will be used broadly to refer to any collection of data. The data of the database and/or the index does not need to be structured in any particular way and it can be stored on storage devices in one or more geographic locations.

Vision data module 114 may be configured to obtain digital images and/or other imagery data from various sources, such as imagery database 116 purposed as an imagery clearinghouse, as well as from sources such as robots $108_{1-M}$, imagery captured by agricultural personnel, and/or video camera 109. Vision data module 114 may then provide these imagery data to inference module 118. In other implementations, vision data module 114 may be omitted and the functions described herein as being performed by vision data module 114 may be performed by other components of plant knowledge system 104, such as inference module 118.

Inference module 118 may be configured to process imagery data received from vision data module 114 as input based on various machine learning models stored in machine learning model database 120 to generate output. This output may be indicative of whole plants and/or constituent structural features of plants (also referred to as "plant parts") that are detected, segmented, and/or classified in imagery data received from vision data module 114. To this end, machine learning models stored in database 120 may be trained to detect, classify, and/or segment plants/plant parts within imagery data, such as two-dimensional digital images of agricultural area(s) 112 captured by agricultural personnel, robot(s) $108_{1-M}$, and/or camera 109.

Various types of machine learning models may be trained, e.g., using synthetic training data generated using techniques described herein, to detect, classify, and/or segment particular plants/plant parts in imagery data. In some implementations, a convolutional neural network ("CNN") may be trained to generate output indicative of one or more types of plants/plant parts detected in digital imagery. In FIG. 1, for instance, inference module 118 generates annotated image(s) 122 that include pixel-wise annotations identifying one or more detected plants. These pixel-wise annotations may be used, for instance, to segment the digital image into portions showing targeted types of plants, constituent plant parts, etc. In some such implementations, farm task module 124 may be configured to take various actions using these annotated and/or segmented images 122.

For example, in some implementations, farm task module 124 may deploy one or more robots 108 to take action, such as pulling a weed, spraying the weed with chemicals, destroying the weed using other mechanical and/or energy-based means, harvesting desired plant parts (e.g., fruits, flowers, etc.), and so forth. In other implementations, inference module 118 may output one or more probabilities that one or more plant types are detected in an image. In some implementations, farm task module 124 may provide output that includes, for instance, crop harvesting instructions, a map of crops that are ready for harvesting, a map of weeds ready for remediation by agricultural personnel, etc.

In some implementations, one or more components of plant knowledge system 104 may be implemented in whole or in part on a robot 108. For example, inference module 118 may be implemented in whole or in part on a robot 108 that is also equipped with a vision sensor such as a two-dimensional camera. By having an onboard inference module 118, robot 108 may be able to process its own images to quickly detect targeted plants/plant parts. Robot 108 may also include its own farm task module 124 that enables robot 108 to take various actions, such as harvesting, treating, and/or destroying the detected plant(s).

As noted previously, obtaining sufficient ground truth training data to train machine learning model(s) such as CNNs to detect particular types of plants and/or constituent parts of plants may be resource-intensive and/or difficult. Accordingly, techniques are described herein for realistic plant growth modeling that can be used for, among other things, generating synthetic training data with little or no human intervention that can be used to train machine learning model(s) such as CNNs to detect particular types of plants and/or constituent structural features of those particular types of plants.

Figure 2:
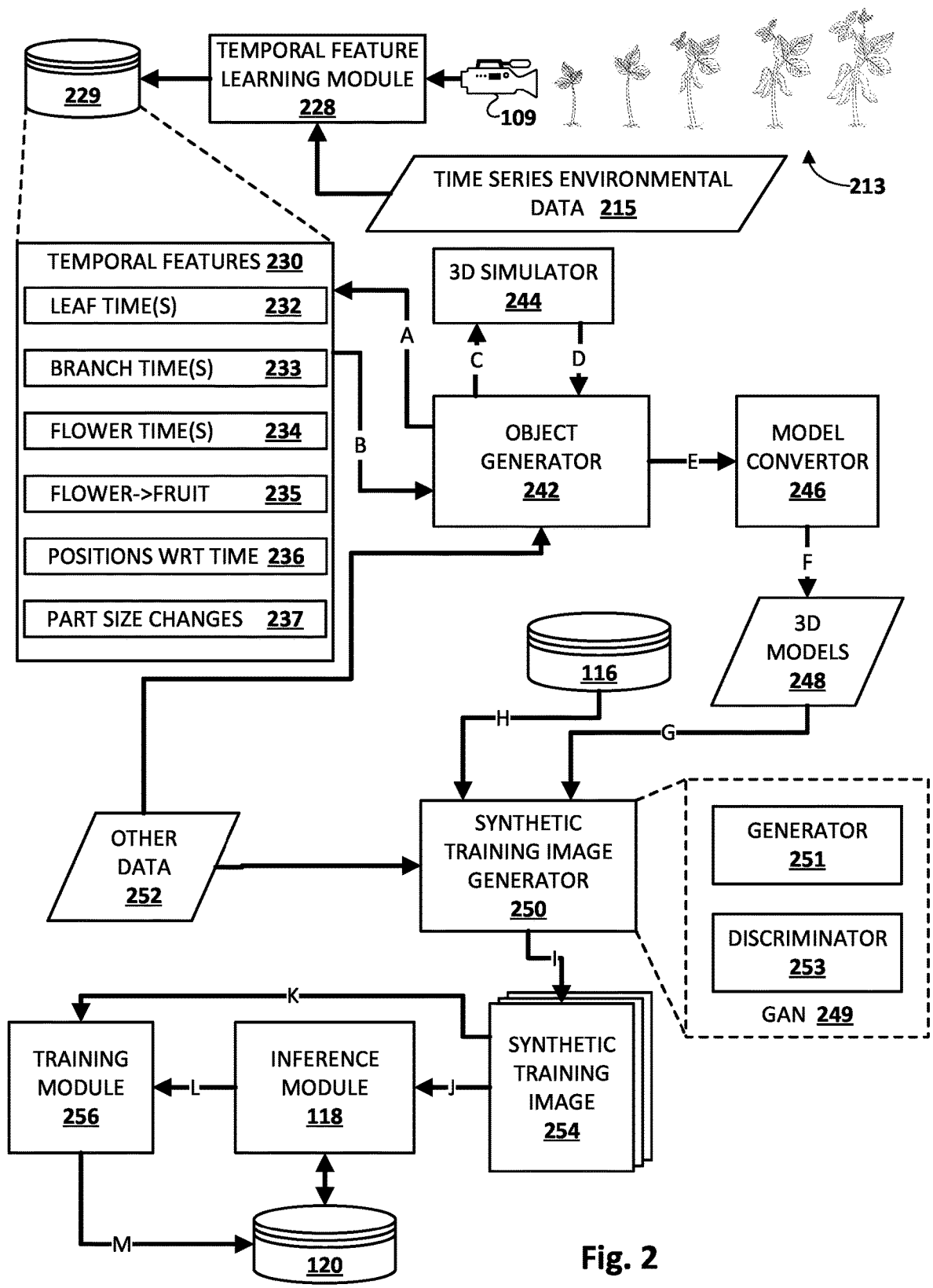
FIG. 2 schematically depicts components and a process for practicing selected aspects of the present disclosure, in accordance with various implementations.

FIG. 2 depicts an example process flow in which techniques for realistic plant growth modeling are used to generate synthetic training data in accordance with various implementations described herein. Starting at top right, video camera 109 (which may or may not capture time lapse video) is operated to acquire a temporal sequence of digital images 213 that capture growth of a particular type of plant over time. Meanwhile, time series environmental data 215 observed in the geographic area from which temporal sequence digital images 213 were captured may also be provided, e.g., in temporal synchronization with the images.

Time series environmental data 215 may include any stimuli that influences growth of plants, whether human-induced or otherwise. For example, time series environmental data 215 may include, but is not limited to, precipitation, irrigation, temperature, humidity, soil moisture over time, wind, sunlight exposure, fertilizer application, pesticide application, herbicide application, presence of pest or plant disease, etc. Time series environmental data 215 may be gathered from a variety of different sources, such as publicly-available databases (e.g., from government and/or academic entities), agricultural personnel who managed the growth of the plants captured in temporal sequence 213, sensors deployed in the area in which temporal sequence 213 was captured, While not depicted in FIG. 2, additional or alternative temporal data may be provided. For example, in some implementations, non-video temporal sequences of images may be captured by robot(s) and/or agricultural workers over time. Additionally or alternatively, 3D point clouds of various plant parts—e.g., generated from 2D imagery using techniques such as SFM, or captured using 2.5 and/or 3D sensors, such as a Light Detection and Ranging (LIDAR) sensor—may be provided.

A temporal feature learning module 228, which in various implementations may be implemented using any combination of hardware and software, and which in some cases may be part of plant knowledge system 102, may analyze temporal sequence of digital images 213, time series environmental data 215, and/or any other input data to extract, and store in a database 229, temporal features 230 that capture change over time to one or more structural features of the particular type of plant, and correlations between those changes and the time series environmental data 215. Database 229 may be integral with plant knowledge system 102 and/or separate therefrom.

Temporal features 230 may come in various forms. Many of these temporal features 230 may take the form of growth time intervals of one or more of the structural features of the particular type of plant. For example, in FIG. 2, growth parameters 230 include leaf time(s) 232, branch time(s) 233, flower time(s) 234, flower to fruit time(s) 235, positions of various constituent structural features (e.g., plant parts) with regard to (WRT in FIG. 2) time 236, and sizes of various constituent structural features over time 237. Other temporal features 230 are contemplated.

Any of these temporal features 230 may be influenced by a variety of factors, such as climate, human-induced agricultural activity such as fertilization and irrigation, soil composition, pests in the area, circulating plant disease, etc. These influential factors are captured in time series environmental data 215. By processing temporal sequence of images 213 (and other images and/or 3D point clouds, if available) along with time series environmental data 215, e.g., using regression analysis, correlations between the temporal features and environmental conditions may be identified and learned as part of the parameter spaces described herein.

Leaf time(s) 232 may include time intervals for individual leaves (e.g., the first leaf, the second leaf, etc.) of the particular type of plant to emerge, e.g., after germination or some other growth stage or benchmark. Thus, in some implementations, for a given plant, there may be as many leaf times 232 as there are leaves detected in digital imagery that captures the plant. Branch time(s) 233 and flower time(s) 234 are similar to leaf times 232, except for branches and flowers, respectively. Development of other plant parts over time may be similarly tracked.

Flower-to-fruit time(s) 235 may represent time intervals for development of flowers to fruit (fruit may be the ultimate plant part of economic/nutritional/medicinal interest). Not every flower is necessarily pollinated, so the number of flower-to-fruit times 235 does not necessarily coincide with the number of flower time(s) 234. Positions with regard to time 236 may track positions of constituent structural features/plant parts on the plant over time. As one non-limiting example, as the plant grows, flowers and/or fruit may gain mass, which may cause the branches that support them to droop or sag. As another example, as a plant grows taller, various structural features such as petioles and the leaves they support may be elevated. Part size changes 237 may track changes in size and/or mass of constituent structural features over time, particularly of fruits and other plant parts of interest.

Temporal features 230 may be used, e.g., by an object generator 242 or 3D simulator 244, to generate 3D plant growth models. In particular, temporal features 230 may be used to learn one or more parameter subspaces of plant parameters that are usable to generate a 3D plant growth model that simulates growth of a particular type of plant over time. In some implementations, these parameter subspaces may act as constraints that ensure 3D plant growth models that are generated using techniques described herein exhibit growth that is realistic, because that growth closely resembles real-world growth of real-world plants.

In some implementations, temporal feature learning module 228 may train a machine learning model to learn correlations between the temporal features 230 and time series environmental data 215. For example, a time series machine learning model such as various types of RNNs (e.g., LSTM, GRU, etc.) may be jointly trained on both temporal features 230 and corresponding environmental trends detected in time series environmental data 215 to learn these correlations. For example, at each of multiple iterations of applying the RNN, the input may include annotation(s) of plant part(s), e.g., bounding boxes or particular dimensions, as well as environmental features of the geographic area at that that same time (e.g., same day, same moment, etc.). Additional input at each iteration may include an internal state or memory of the RNN. The output at each iteration may include, for instance, prediction(s) of new dimensions of the bounding boxes at the next iteration, and/or new bounding boxes that are expected (e.g., a late stage flower may be predicted to develop into an early stage fruit). During training, these predicted dimensions and/or bounding boxes may be compared to ground truth annotations generated for the next digital image of the temporal sequence of the plant. Any difference or error may be used to train the RNN, e.g., using back propagation and gradient descent. In some implementations, once such an RNN is trained, it may be used downstream to realistically simulate plant growth, e.g., by selecting parameters for use in generating a 3D plant growth model.

In some implementations database 229 (or another database) may further include what will be referred to herein as "plant assets." Plant assets may be usable to generate 3D growth models that simulate plant growth over time. Plant assets may include various constituent structural features of plants that are usable as building blocks to generate realistic 3D growth models for plants. These plant assets may include, for instance, leaf textures, contours for leafs, stems, flower shapes, flower textures, fruit shapes, fruit textures, and/or other aspects of plants, materials, and other miscellaneous parameters such as leaf sizes, scale ratios, desired resolution, etc.

In various implementations, object generator 242 and/or 3D simulator 244 may, using the various aforementioned plant assets, non-deterministically generate 3D growth model(s) that simulate growth of one or more particular types of plant. For example, object generator 242 and/or 3D simulator 244 may randomly/stochastically select various constituent plant parts from the plant assets mentioned previously, and may assemble a 3D growth model from the selected assets. In some implementations, this selection may be influenced by one or more of the various temporal parameters 230 and/or by other observed features of particular types of plants, such as average numbers of constituent structural features per plant. In some implementations, temporal features 230 may influence and/or constrain how these selected plant assets develop (e.g., grow, evolve between different states) over time. For example, selected plant assets may be used to determine what will be included in a 3D plant growth model over its lifetime, and the temporal features 230 may be used to determine how those selected plant assets grow during its lifetime.

FIG. 2 depicts an example of how this process may be implemented as part of a larger pipeline, demonstrated by a series of arrows A-M in FIG. 2, to generate 2D synthetic training images 254. FIG. 2 also demonstrates how those synthetic training images 254 may then be used to train one or more machine learning models stored in machine learning model database 120. However, 3D growth models generated using techniques described herein may be used for purposes other than synthetic data generation.

At arrows A and B, object generator 242 (which may or may not be part of plant knowledge system 104 and may be implemented using any combination of hardware and computer-readable instructions) may non-deterministically (e.g., randomly, stochastically) select various plant assets from database 229. This selection may be random or pseudo random in order that each 3D growth model that is generated for inclusion in training data is different from each other, as would be the case in real life.

At arrow C, the randomly-selected assets and/or an object representative thereof (e.g., an XML file that spells out how many leaves, their size, a size of the plant, a color of the plant, etc.) may be provided to 3D simulator 244, which also may or may not be part of plant knowledge system 104 and may be implemented using any combination of hardware or computer-readable instructions. Based on these objects and/or the assets represented/conveyed by these objects, and subject to the parameter subspace(s) learned based on temporal features 230, 3D simulator 244 may generate 3D growth model(s) that simulate growth of targeted plants over time. For example, to train a machine learning model to detect dandelions, 3D simulator 244 may generate a plurality of 3D growth models that simulate the growth of dandelion plants. 3D simulator 244 may return the generated 3D models to object generator 242 at arrow D or may provide them directly to another downstream component.

In some implementations, object generator 242 and/or 3D simulator 244 may also use other data 252 to generate 3D growth models. In various implementations, other data 252 may include time-series data corresponding to one or more environmental conditions of an agricultural area of interest, such as daily precipitation, daily sun exposure, periodic fertilizer application, periodic temperature readings, periodic soil composition measurements, periodic soil pH levels, and/or pesticide applications, to name a few. The agricultural area of interest itself may be the area in which the 3D growth models are meant to be simulated.

In some such implementations, object generator 242 and/or 3D simulator 244 may employ a time-series machine learning model such as a recurrent neural network ("RNN"), a long short-term memory ("LSTM"), a gated recurrent unit ("GRU") network, etc., to process this time-series data and generate 3D growth models. For example, a new 3D version of a synthetic plant may be generated at each iteration of an RNN or LSTM based on the previous iteration's output and the current iteration's corresponding time series data. In some implementations, the output generated at each iteration may include a snapshot of a 3D growth model that simulates the plant at a particular point in time. In other implementations the output may include predicted features of plants at that point in time, such as leaf size, number of leaves per plant, plant height, leaf color, number of flowers/fruit per plant, etc.

Referring back to FIG. 2, in some implementations, at arrow E, object generator 242 may provide the 3D plant model(s) to a model converter 246. As with other components in FIG. 2, model convertor 246 may or may not be part of plant knowledge system 104 and may be implemented using any combination of hardware and/or computer-readable instructions. At arrow F, model converter 246 may be configured to convert the 3D models into various formats of 3D models 248, some of which may be standardized formats for representing 3D objects, such as *.obj, *.mtl, *.urdf, and so forth. In other implementations, model convertor 246 may be omitted.

At arrow G, the 3D plant models 248 may be provided (from model convertor 246, object generator 242, or even 3D simulator 244) to a synthetic training image generator 250. Synthetic training image generator 250, which again may be implemented using any combination of hardware and/or computer-readable instructions, may be configured to generate synthetic training data, such as one or more synthetic training images 254. For example, at arrow H, one or more images may be retrieved from imagery database 116 (e.g., via vision data module 114). In some cases, these images may depict agricultural area(s) (e.g., 112) in which 3D growth models are to be simulated.

In addition to the imagery retrieved from database 116, in some implementations, at least some of the other data 252 mentioned previously may also be retrieved and used by synthetic training image generator 250 for use in generating synthetic training images 254, particularly for graphically incorporating the 3D plant models into the canvas digital images that depict the agricultural area of interest. This may include, for example, environmental conditions leading up to and including the moment at which the imagery was captured. This may also include the lighting condition mentioned previously. For example, synthetic training image generator 250 may render adjacent 3D plant models on the two-dimensional canvas image and shadows that simulate real life shadows that would be present if the 3D plant models were actually present in the agricultural area 112.

As shown in FIG. 2 and mentioned previously, synthetic training image generator 250 may be configured to obtain a digital image that captures an area from database 116. Based on this lighting condition at the time the image was captured and/or based on an agricultural history of the area, synthetic training image generator 250 may generate a synthetic training image 254 to depict the plurality of 3D synthetic plants in the agricultural area. In some implementations, the generating may include graphically incorporating the plurality of 3D plant models into the digital image capturing the agricultural area 112, taking into account the lighting condition at the time the underlying digital image was captured.

In some implementations, and as shown in the dashed exploded view, synthetic training image generator 250 may employ a generator model 251 that is trained as part of a larger generative adversarial network ("GAN") 249 to generate synthetic training images 254 that are as realistic as possible. Such a GAN 249 may also include a discriminator model 253 that is trained to generate output that predicts whether an input image is, for instance, "synthetic" or "real." The generator model 251 and discriminator model 253 may or may not be trained in tandem. The discriminator model 253 may be used to process both real images (e.g., captured using a camera) and synthetic images generated by the generator model 251. The fact that the discriminator model 253 correctly classifies an image as synthetic may be used as a negative training example that causes the generator model 251 to improve its own performance. When the discriminator model 253 incorrectly classifies a "real" image as synthetic, the discriminator model 253 may be trained to improve its own performance. The generator model 251 may be considered to be sufficiently trained when it is able to "fool" the discriminator model 253, e.g., more than some threshold number of times.

As noted previously, synthetic training data generated using techniques described herein are not limited to plants generated with 3D growth models. In some implementations, certain types of plants, such as weeds, may be grown in a controlled environment, such as a small plot in which they are spaced apart from each other. 2D digital images may be captured of these plants, e.g., from overhead or from another angle. A learning-based mask extraction process may then be implemented in which these digital images are processed, e.g., using a weed mask that is developed to detect and extract the particular type of weed. These extracted 2D plants may be overlaid, e.g., by synthetic training image generator 250, onto synthetic training images that also include plants generated using 3D growth models as described herein. Extracting 2D plants and overlaying them in images may be less expensive computationally than generating full 3D growth models, thus providing a faster, lighter, and/or complementary approach to adding additional plants and/or realism to synthetic imagery. In various implementations, these 2D overlaid plants may be spaced and/or lighted in accordance with the environmental conditions in the area depicted in the synthetic training data.

At arrow I, synthetic training image generator 250 may output synthetic training images 254. At arrow J, an inference module 118 (e.g., the same as or sharing characteristic (s) with inference module 118 of FIG. 1) may apply the synthetic training images 254 as input across one or more machine learning models (e.g., CNN) from machine learning model database 120 to generate output at arrow L. Meanwhile, at arrow K, synthetic training images 254 may also be provided to a training module 256. Because synthetic training images 254 are generated using 3D growth models that are graphically incorporated at known pixel locations, they may effectively form annotated or labeled training data that can compared by training module 256 with the output generated by inference module 118 at arrow L (e.g., pixel-wise plant classifications similar to 122 in FIG. 1). The error between the output of inference module 118 and the annotations/labels can be used by training module 256 to train the machine learning model, which is updated in database at arrow M. In some implementations, non-synthetic (i.e. ground truth) images depicting agricultural areas in which targeted plants are present may also be used by training module 256 as training data. In some such implementations, these ground truth images may be labeled, e.g., using bounding boxes or on a pixel-wise basis, to identify locations of targeted plants.

Figure 3:
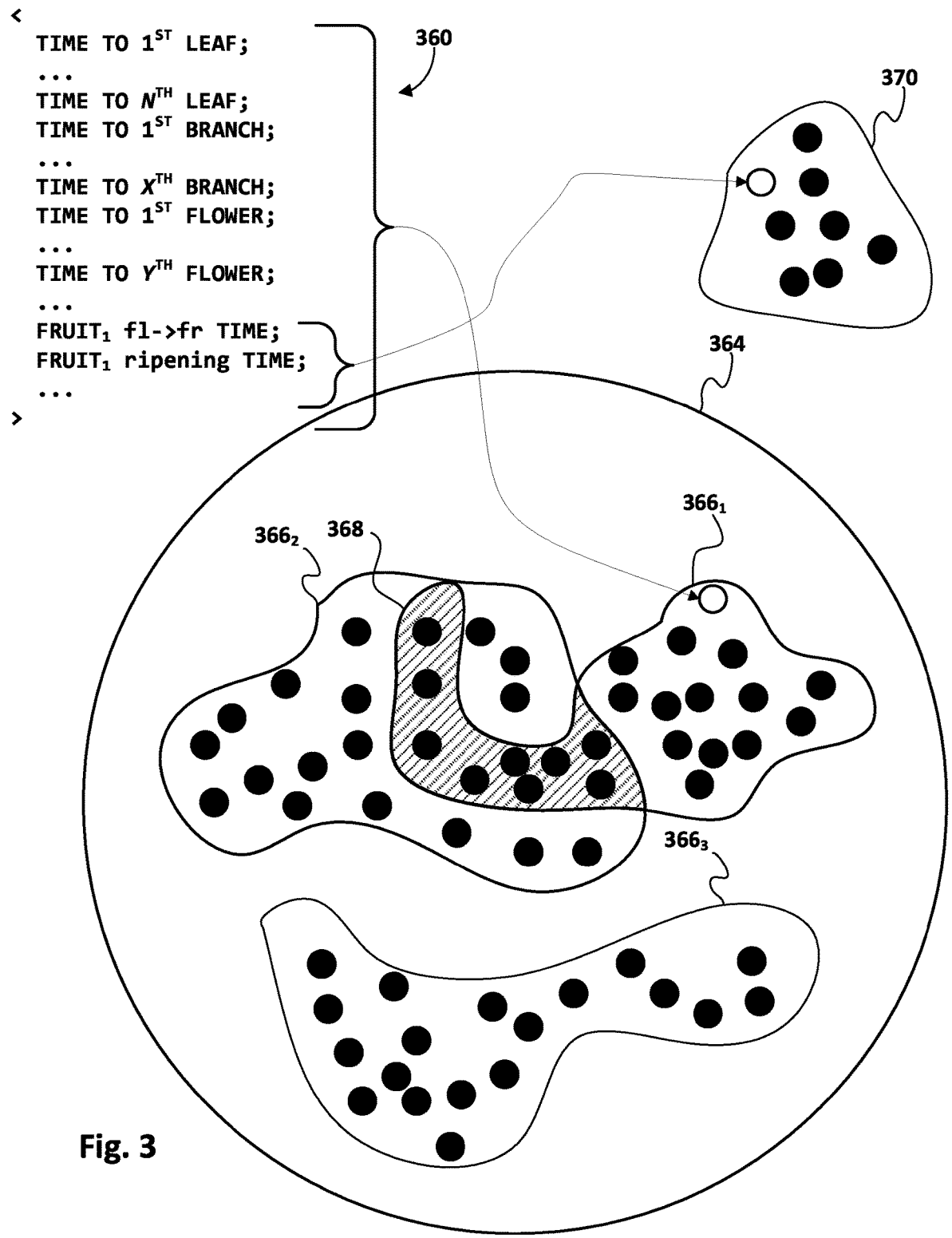
FIG. 3 schematically depicts an example of how dimensionality reduction may be used to map temporal features capturing a particular plant's growth over time to parameter space(s), in accordance with various implementations.

FIG. 3 depicts one non-limiting example of how temporal features may be used to learn one or more parameter subspaces. As noted above, these parameter subspace(s) may influence generation of 3D growth models, such as constraining how constituent plant parts are simulated to develop over time. A feature vector 360 includes a plurality of temporal features that were extracted from temporal sequence(s) of digital images capturing one or more instances of a particular type of plant, i.e. a plant of interest. The individual temporal features of feature vector 360 may at least partially correspond to temporal features 230 of FIG. 2.

A whole plant parameter space 364 is depicted that may encompass, for instance, all possible growth parameters for all possible types of plants, or subsets of multiple types of plants. For example, if the particular type of plant of interest is sugar beet (*Beta vulgaris* subsp. *vulgaris*), then whole plant parameter space 364 may capture growth parameters for sugar beets and other members of the *Beta vulgaris* species, or even other members (flowering plants) of the *Beta* genus.

Within whole plant parameter space 364, multiple different parameter subspaces $366_{1-3}$ have been learned, each corresponding to growth of a particular type of plant. For example, temporal features extracted from multiple instances of a particular type of plant may be mapped to a region of whole plant parameter space 364, and the region can be learned (e.g., jointly with other parameter subspaces for one or more constituent plant parts of the particular type of plant) and/or indexed as a parameter subspace 366. In some implementations, one or more of the parameter subspaces $366_{1-3}$ may be defined as a manifold, although this is not required. In some implementations, a parameter subspace may be formed by embeddings that are sufficiently similar to each other, which may be calculated based on their distances from each other in parameter space 364. Distances between embeddings may be calculated in various ways, such as by using cosine similarity, dot product, etc.

Three parameter subspaces $366_{1-3}$ are depicted in FIG. 3 for illustrative purposes; it should be understood that any number of parameter subspaces corresponding to any number of plant types may be identified and/or indexed. Moreover, whole plant parameter space 364 and parameter subspaces $366_{1-3}$ are depicted in 2D for illustrative purposes only. In practice, these spaces may have as many dimensions as there are slots in feature vector 230. Within each parameter subspace 366, there are some number of embeddings represented by black dots. Each embedding may correspond to a mapping of a feature vector into whole plant space 364.

As shown in FIG. 3, feature vector 360 maps to an embedding represented by a white dot within first parameter subspace $366_1$. Consequently, first parameter subspace $366_1$ protrudes upwards on the page slightly to capture the embedding represented by that white dot that corresponds to feature vector 360. This illustrates the notion that as more feature vectors of the particular type of plant corresponding to first parameter subspace $366_1$ are mapped, the dimensions of first parameter subspace $366_1$ may change accordingly.

Many plants may exhibit similar growth patterns. For example, different varietals of a particular crop may have many features in common, in addition to features that distinguish the varietals from each other. Accordingly, it is not required that parameter subspaces $366_{1-3}$ be disjoint. Rather, and as indicated by the shaded region 368 in FIG. 3, in many cases, parameter subspaces may overlap within whole plant parameter space 364. However, this is not required, as indicated by third parameter subspace $366_3$ being disjoint from the other two.

In some implementations, additional parameter subspaces may be learned for constituent plant parts. These constituent plant part parameter subspaces may or may not be learned jointly with whole plant parameter subspaces $366_{1-3}$, and may or may not be part of the same whole plant parameter space 364. For example, in FIG. 3, a plant part parameter subspace 370 is depicted at top right and includes embeddings (black dots) that correspond to feature vectors of temporal features associated with constituent plant parts. One constituent plant part of the plant represented by feature vector 360—$FRUIT_1$, which may be one of multiple fruits of the plant—is mapped to an embedding represented by another white dot in plant part parameter subspace 370. Other fruits of the same plant or different plants of the same type may also be mapped to plant part parameter subspace 370. And other plant part parameter subspaces may be identified/indexed as desired or warranted.

Temporal features of constituent plant parts may be extracted from 2D digital imagery in various ways. In some implementations, constituent plant parts may be detected/segmented in the 2D digital imagery (e.g., 213) and used to generate respective temporal sequences of 3D point clouds for each of the one or more detected constituent plant parts. In some such implementations, techniques such as structure from motion (SFM) may be used to construct the 3D point clouds. Consequently, each of the respective temporal sequences of 3D point clouds may capture growth of the corresponding constituent plant part over time. In some implementations, based on the respective temporal sequence of 3D point clouds, plant part parameter subspaces of plant part parameters, such as plant part parameter subspace 370 in FIG. 3, may be learned. These plant part parameter subspaces may be similar to whole plant parameter subspaces $366_{1-3}$ in that they are usable to simulate growth of 3D models of the constituent plant part over time.

While not depicted in FIG. 3, in some implementations, correlation(s) between the temporal features of feature vector 360 and time series environmental data (e.g., 215 in FIG. 2) may also be included in feature vector 360. For example, and as indicated by the ellipses, feature vector 360 may include additional dimensions beyond those depicted in FIG. 3. These additional dimensions may include, for instance, cumulative measures of various phenomena (e.g., precipitation/irrigation, sunlight) between particular milestones (e.g., up to emergence of nth leaf, between growth of fruit from first size to second size, throughout entire crop cycle, etc.), average measures of various phenomena over time, etc.

Figure 4:
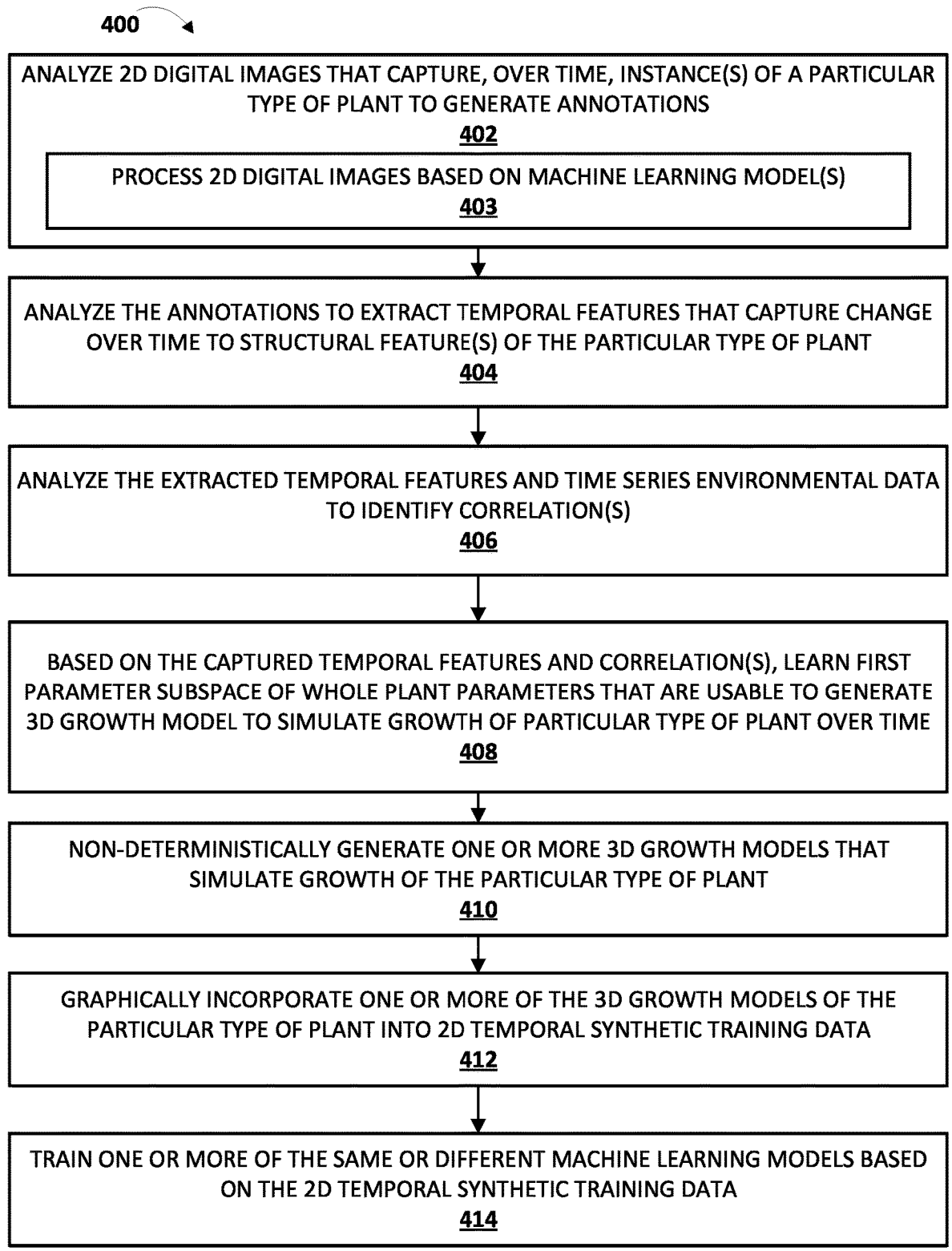
FIG. 4 is a flowchart of an example method in accordance with various implementations described herein.

FIG. 4 illustrates a flowchart of an example method 400 for practicing selected aspects of the present disclosure. The operations of FIG. 4 can be performed by one or more processors, such as one or more processors of the various computing devices/systems described herein, such as by plant knowledge system 104. For convenience, operations of method 400 will be described as being performed by a system configured with selected aspects of the present disclosure. Other implementations may include additional operations than those illustrated in FIG. 4, may perform step(s) of FIG. 4 in a different order and/or in parallel, and/or may omit one or more of the operations of FIG. 4.

At block 402, the system may analyze a plurality of 2D digital images that capture, over time, one or more of a particular type of plant to generate annotations of those images. In some implementations, this analysis may be performed manually. In other implementations, this analysis may be performed automatically. For example, at block 403, the 2D digital images may be processed using a machine learning model such as a CNN to generate output that includes annotations of whole plants and/or constituent plant parts in the digital images, e.g., on a pixel-wise or bounding shapes basis.

In many cases, the machine learning model that is used to generate the output at block 403 may be different than those that are trained using the synthetic data generated downstream. For example, processing imagery using the machine learning model at block 403 may not necessarily generate pixel-wise annotations, or even image annotations at all. Rather, the machine learning model applied at block 403 may merely identify (e.g., count) a number of items such as leaves that are detected in each image. Thus, for a temporal sequence of images such as a time lapse video, the machine learning model may simply output, for each frame, the number of detected leaves (or other plant parts), approximate sizes of those parts, etc.

Additionally, the imagery that is processed at block 403 may be deliberately less complex than the synthetic training images generated later, and less complex than real-world imagery that is ultimately analyzed using other machine learning models trained with synthetic data generated based on 3D growth models described herein. For example, test beds of the particular plant type of interest may be grown, with only the particular types of plants present, spaced from each other, and without other noise such as weeds or other plants. By using simpler imagery, the machine learning model that is applied at block 403 can be less accurate than those that are ultimately trained downstream.

At block 404, the system may analyze the output annotations to extract temporal features that capture change over time to one or more structural features of the particular type of plant. In some implementations, the system may use pixel-wise and/or bounding shape annotations to detect and/or measure (e.g., using pixels as a proxy for distance) various constituent structural features—e.g., plant parts—to extract temporal features such as temporal features 230 depicted in FIG. 2. For example, as new leaves are detected in the temporal sequence of images, an indication of a time interval to emergence of each new leaf (measured, for instance, using timestamps or other similar metadata associated with the digital images) may be learned. As another example, as a particular fruit changes in size over time, one or more time intervals between the fruit hitting various size benchmarks may be recorded. In some implementations, 3D point clouds may be generated for the corresponding plant parts, e.g., using techniques such as SFM. These 3D point clouds may then be measured to determine one or more temporal features.

At block 406, the system may analyze the extracted temporal features and time series environmental data (e.g., 215 in FIG. 2) to identify one or more correlations between them. In some implementations, this may include performing regression analysis to map environmental data features, including environmental trends over time, with temporal features of plant growth. In some implementations, environmental trends over time may be captured as environmental temporal features, similar to the temporal features of plant growth. Mapping(s) may be calculated between those environmental temporal features and the temporal features extracted at block 404. In some implementations, a RNN or other similar machine learning model may be jointly trained on the temporal features and corresponding time series environmental data to learn the correlation(s), as described previously with respect to temporal feature learning module 228 in FIG. 2.

Based on the temporal features extracted at block 404 and the correlation(s) identified at block 406, at block 408, the system may learn a first parameter subspace of whole plant parameters that are usable to generate a 3D growth model that simulates growth of the particular type of plant over time. In some implementations, this learning may include calculating various statistics for growth of the particular type of plant over time based on distributions of the temporal features across multiple instances of the particular type of plant. These statistics may include, but are not limited to, means and/or medians of one or more temporal features, variances of one or more temporal features, quantiles of one or more temporal features, correlations between various temporal features and time series data, etc. These statistics may be usable to constrain the generation of 3D growth models.

Additionally or alternatively, in some implementations, and as depicted in FIG. 3, feature vectors may be generated for instances of the particular type of plant, and those feature vectors may be mapped, e.g., using dimensionality reduction, to embeddings in a parameter space/subspace. The resulting first parameter subspace that captures all embeddings for the particular type of plant may or may not be a manifold. In some implementations, the learning of block 408 may include applying a generator (e.g., 251) and discriminator (e.g., 253) of a GAN (e.g., 249) to search and validate parameters of the first parameter subspace.

In some implementations, the first parameter subspace may be a whole plant parameter subspace that constrains generation of every aspect of a 3D growth model. However, this is not meant to be limiting. In some implementations, multiple parameter subspaces may be learned (jointly or otherwise), e.g., one parameter subspace for growth of the plant's overall geometry (e.g., how many branches or nodes emerge, when/where those branches/nodes emerge) of the particular type of plant, another parameter space for emergence and/or growth of fruits of the particular type of plant (which can be used to replace the aforementioned nodes), another parameter space for emergence and/or growth of leaves of the particular type of plant (also potentially usable to replace the aforementioned nodes), and so on.

Based on the first parameter subspace, at block 410, the system may non-deterministically generate one or more 3D growth models that simulate growth of the particular type of plant. For example, object generator 242 and/or 3D simulator 244 may randomly, pseudo-randomly, and/or stochastically select various plant assets associated with the particular type of plant, and/or may use those assets to generate a 3D growth model that conforms to the first parameter subspace (and any additional parameter subspaces, if applicable). In some implementations, the temporal constraints (e.g., how quickly various plant parts grow or emerge) that are imposed on the 3D growth model may be randomly, pseudo-randomly, and/or stochastically selected as well, e.g., from the first parameter subspace (and any additional parameter subspaces, if applicable).

In some implementations, the parameter subspace may be used to select (e.g., stochastically, randomly, non-deterministically) inputs to process using a time series machine learning model such as the RNN trained by temporal feature learning module 228. The output of the RNN at each iteration may include predicted dimensions of bounding boxes at a next iteration. These predicted dimensions, which may correspond to predicted dimensions of various plant parts (e.g., flowers, fruit, etc.), may be usable as parameters for generation of a 3D plant growth model.

At block 412, the system, e.g., by way of synthetic training image generator 250, may graphically incorporate one or more of the 3D growth models of the particular type of plant into 2D temporal synthetic training data. For example, at given moments in time, snapshots of the 3D growth model at a particular stage of growth that correspond to the given moments may be incorporated into (e.g., projected onto, superimposed) real-world imagery of an agricultural area, such as a field or plot. Alternatively, snapshots of the 3D growth model at a particular stage of growth that correspond to the given moments may be incorporated into synthetic images. At block 414, the system, e.g., by way of inference module 118 and training module 256, may train one or more of the same machine learning models applied in block 402 or different machine learning models based on the 2D temporal synthetic training data.

Techniques described herein are not limited to generation of synthetic training data. For example, 3D plant growth models generated using techniques described herein may be used to allow agricultural personnel to realistically simulate plant growth based on a variety of different features. This may provide a variety of benefits to agricultural personnel, such as performing "what if" analysis to determine how various actions they take may impact plant growth.

Figure 5A:
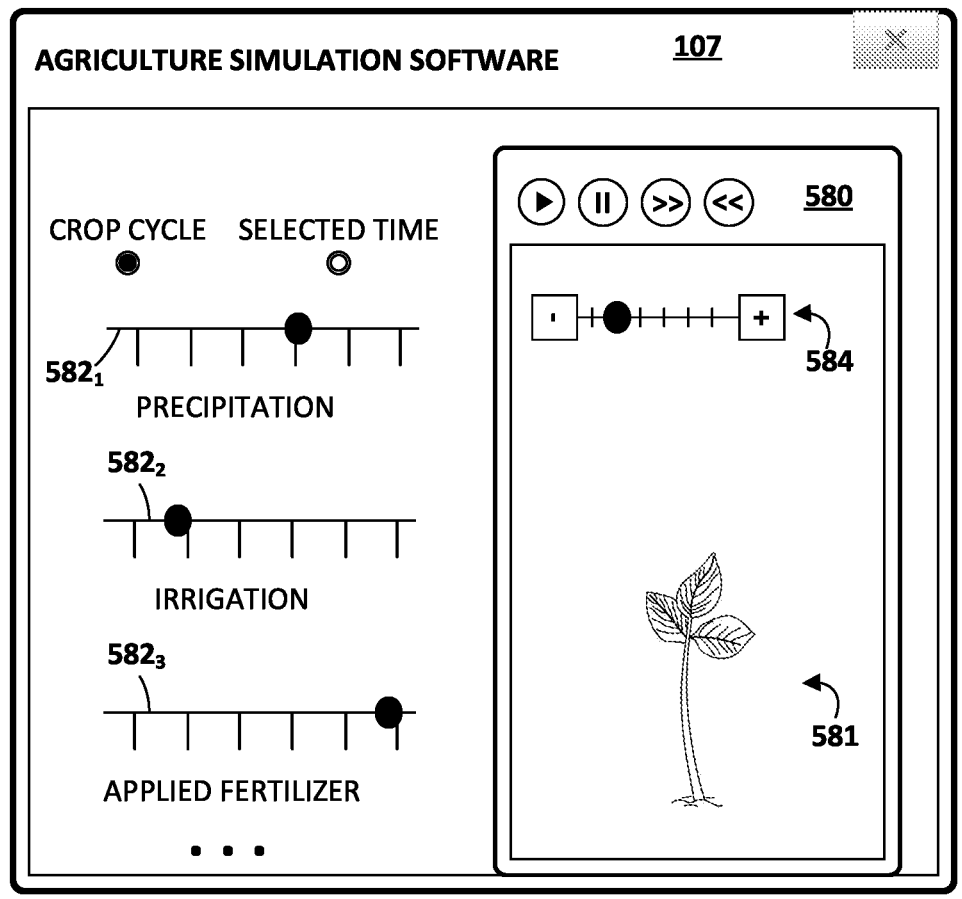
FIG. 5A and FIG. 5B depict an example graphical user interface, configured with selected aspects of the present disclosure, being operated to render simulated plant growth, in accordance with various implementations.
Figure 5B:
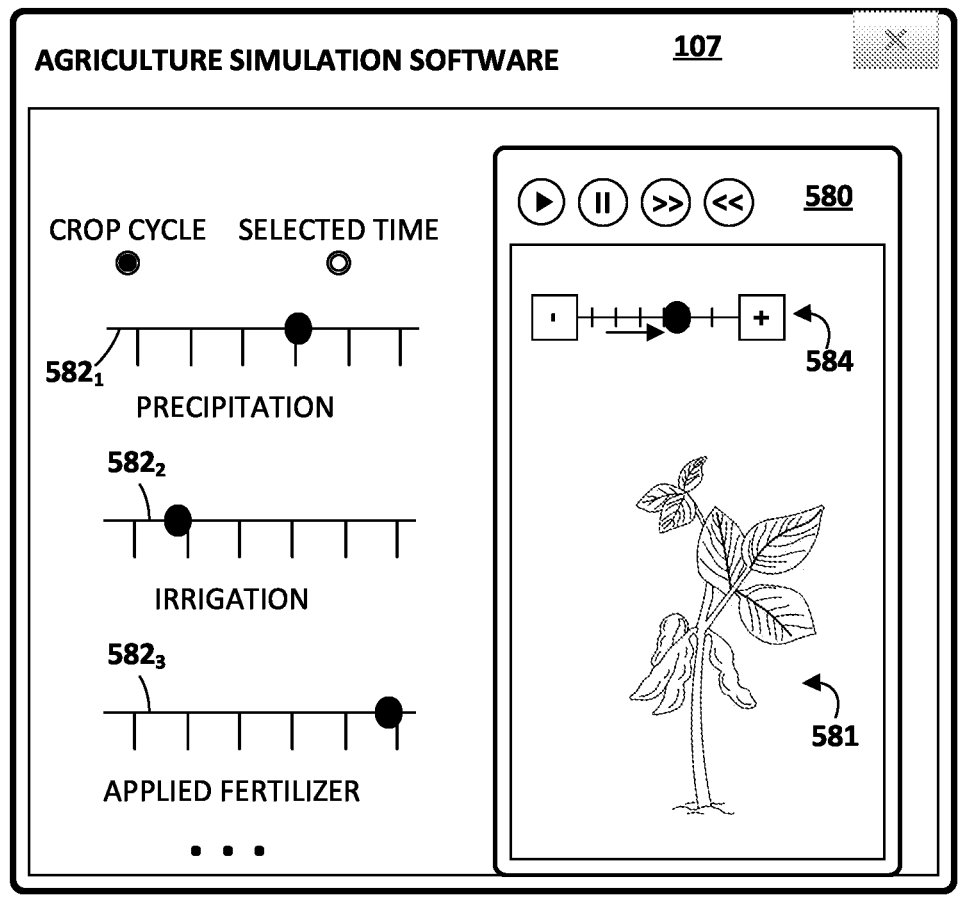

FIG. 5A and FIG. 5B depict an example graphical user interface (GUI) that may be rendered, e.g., by AG client 107 as "Agricultural Simulation Software," in order to allow for realistic simulation of plant growth. A viewing window 580 renders one or more plant growth models 581 at various stages of growth. Because the GUI in FIGS. 5A-B is 2D, the rendition of plant growth model(s) 581 is also 2D. However, this is not meant to be limiting. On a different type of device, such as HMD $106_X$ in FIG. 1, plant growth model(s) 581 may be rendered in 3D.

Viewing window 580 may include a variety of controls to control how quickly time elapses, and hence, how rapidly plant growth model(s) 581 appear to grow (the growth over time may be animated). For example, buttons for "play," "pause," "fast forward," and "rewind" are depicted at the top of viewing window 580. One or more of these buttons may be omitted, and additional buttons may be added. Also, a temporal slider 584 that allows the user to select when in a given time interval, such as an overall crop cycle, plant growth model(s) 581 should be set at. In FIG. 5A, slider 584 is set relatively early within the time interval. Consequently, plant growth model 581 is relatively small. In FIG. 5B, slider 584 has been set later in the time interval. Consequently, plant growth model 581 is larger, and more plant parts have developed.

On the left, a series of adjustment sliders $582_{1-3}$ are depicted, each corresponding to a parameter that can be adjusted to influence the growth of plant growth model(s) 581. While three sliders are depicted in FIGS. 5A-B, any number of sliders corresponding to any number of adjustable parameters may be provided. In some implementations, the values that can be input by such input elements (e.g., the minimum and maximum values of each slider) may be constrained by the parameter space(s) learned using techniques described herein. Moreover, default values for these sliders may be selected (e.g., stochastically) based on these parameter spaces. Radio buttons are also provided that allow the user to set how each parameter is calculated, e.g., relative to the entire crop cycle or relative to the time selected with slider 584. For example, the selected precipitation level (e.g., 15 inches) may be distributed across an entire crop cycle (e.g., 3 months) or across the portion of the time interval selected by slider 584. In various implementations, the selected precipitation (or other parameters) quantity may be distributed evenly across time, or may be non-deterministically/randomly distributed across time.

Figure 6:
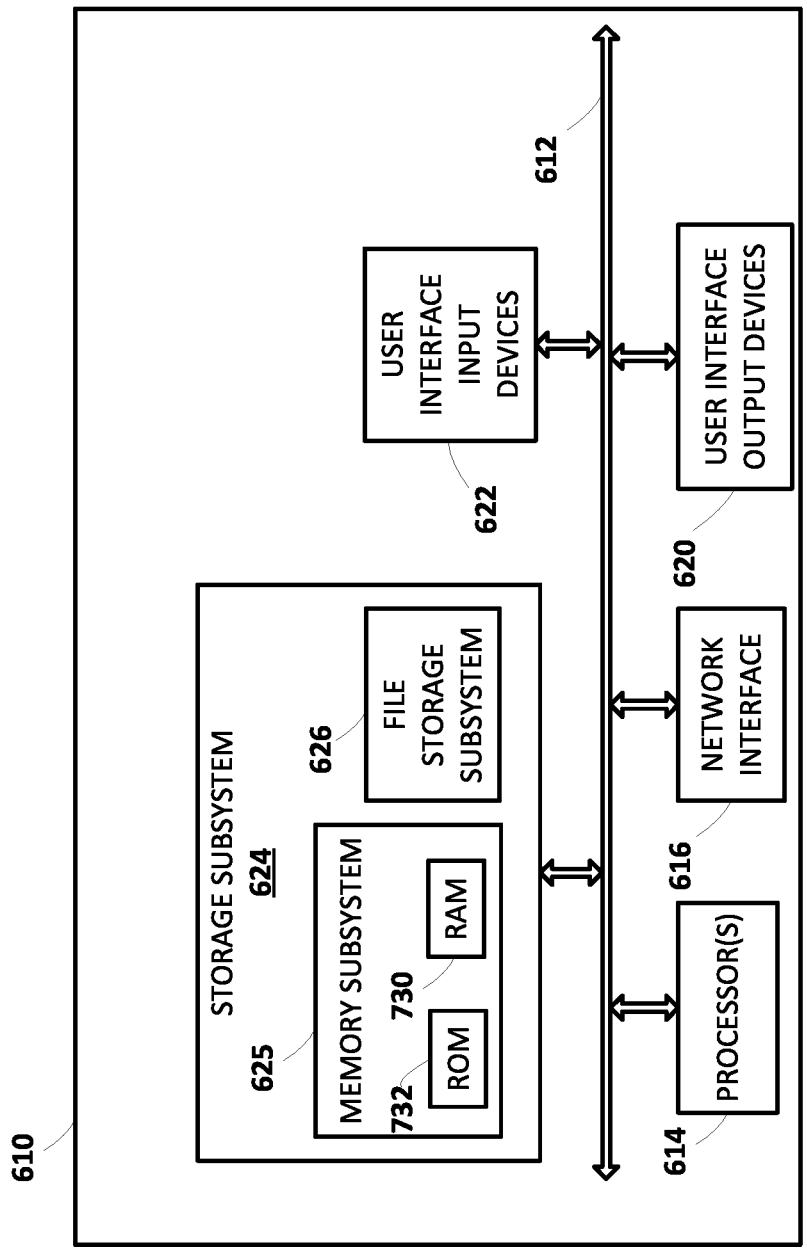
FIG. 6 schematically depicts an example architecture of a computer system.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 610 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of method 400 described herein, as well as to implement various components depicted in FIGS. 1 and 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:

generating, using one or more first machine learning models, an output corresponding to a first two-dimensional (2D) digital image taken at a first time and a second 2D digital image taken at a second time, wherein the first 2D digital image and the second 2D digital image capture one or more of a type of plant, the output to include a first annotation and a second annotation, the first annotation to correspond to one or more structural features of the type of plant at the first time and the second annotation to correspond to the one or more structural features of the type of plant at the second time;

extracting a temporal feature from the first annotation and the second annotation based on a difference between the first annotation and the second annotation;

identifying a correlation between the extracted temporal feature and environmental data corresponding to the first time and the second time, wherein the environmental data is associated with one or more geographic areas in which the first 2D digital image and the second 2D digital image were captured, wherein the correlation is determined based on a mapping between the environmental data and the extracted temporal feature;

generating a first parameter subspace based on the extracted temporal feature and the correlation, wherein a first parameter subspace embedding of the first parameter subspace includes a plant parameter corresponding to one or more extracted temporal features, the correlation, or the environmental data corresponding to the first time and the second time, wherein the first parameter subspace is part of a whole plant parameter space, and wherein the whole plant parameter space corresponds to a species of the type of plant and the first parameter subspace corresponds to the type of plant; and generating one or more three-dimensional (3D) growth models of the type of plant, wherein the one or more 3D growth models learn the first parameter subspace embedding of the first parameter subspace to constrain a simulation of a growth of the type of plant, and wherein the generation of the one or more 3D growth models is based on selection of at least one plant parameter from the first parameter subspace.

2. The method of claim 1, further including:
graphically incorporating the one or more 3D growth models of the type of plant into 2D temporal synthetic training data; and
training one or more second machine learning models based on the 2D temporal synthetic training data.

3. The method of claim 2, wherein the 2D temporal synthetic training data includes one or more 2D training images that each captures a ground truth environment, and wherein each of the one or more 2D training images includes one or more superimposed instances of the one or more 3D growth models of the type of plant.

4. The method of claim 3, wherein the one or more of the 2D training images includes one or more overlaid 2D instances of a weed interspersed with the one or more superimposed instances of the one or more 3D growth models of the type of plant.

5. The method of claim 1, further including:
analyzing the output to detect one or more constituent plant parts in the first 2D digital image and the second 2D digital image;
generating a respective temporal sequence of 3D point clouds for each of the one or more detected constituent plant parts, wherein each of the respective temporal sequences of 3D point clouds captures growth of a corresponding constituent plant part over time; and
based on the respective temporal sequence of 3D point clouds, generate 3D growth models of the constituent plant part over time, wherein the 3D growth models learn a second parameter subspace of constituent plant part parameters to constrain the simulation of the type of plant.

6. The method of claim 1, wherein the extracting the temporal feature includes detecting one or more growth time intervals of the one or more structural features of the type of plant.

7. The method of claim 6, wherein the one or more growth time intervals include time for a flower to develop into a fruit or time for one of the structural features to grow from a first size to a second size.

8. The method of claim 1, wherein the first 2D digital image and the second 2D digital image include one or more videos, wherein each of the one or more videos captures a distinct instance of the type of plant.

9. The method of claim 1, wherein the generating the first parameter subspace includes applying a generator and a discriminator of a generative adversarial network (GAN) to search and validate parameters of the first parameter subspace.

10. A system comprising one or more processors and memory storing instructions that, in response to execution of the instructions by the one or more processors, cause the one or more processors to:
generate, using one or more first machine learning models, an output to correspond to digital imagery that captures at a first time and at a second time one or more of a type of plant, the output to include a first annotation and a second annotation, the first annotation to correspond to one or more structural features of the type of plant at the first time and the second annotation to correspond to the one or more structural features of the type of plant at the second time;
extract a temporal feature from the first annotation and the second annotation based on a difference between the first annotation and the second annotation;
identify a correlation between the extracted temporal feature and environmental data corresponding to the first time and the second time, wherein the environmental data is associated with one or more geographic areas in which the digital imagery was captured, wherein the correlation is determined based on a mapping between the environmental data and the extracted temporal feature;
generate a first parameter subspace based on the extracted temporal feature and the correlation, wherein a first parameter subspace embedding of the first parameter subspace includes a plant parameter corresponding to one or more extracted temporal features, the correlation, or the environmental data corresponding to the first time and the second time, wherein the first parameter subspace is part of a whole plant parameter space, and wherein the whole plant parameter space corresponds to a species of the type of plant and the first parameter subspace corresponds to the type of plant; and
generate one or more three-dimensional (3D) growth models of the type of plant, wherein the one or more 3D growth models learn the first parameter subspace embedding of the first parameter subspace to constrain a simulation of a growth of the type of plant, and wherein the generation of the one or more 3D growth models is based on selection of at least one plant parameter from the first parameter subspace.

11. The system of claim 10, further including instructions to:
graphically incorporate the one or more 3D growth models of the type of plant into 2D temporal synthetic training data; and
train one or more second machine learning models based on the 2D temporal synthetic training data.

12. The system of claim 11, wherein the 2D temporal synthetic training data includes one or more 2D training images that each captures a ground truth environment, and wherein each of the one or more 2D training images includes one or more superimposed instances of the one or more 3D growth models of the type of plant.

13. The system of claim 10, further including instructions to:
analyze the output to detect one or more constituent plant parts in the digital imagery;
generate a respective temporal sequence of 3D point clouds for each of the one or more detected constituent plant parts, wherein each of the respective temporal sequences of 3D point clouds captures growth of a corresponding constituent plant part over time; and based on the respective temporal sequence of 3D point clouds, generate 3D growth models of the constituent plant part over time, wherein the 3D growth models learn a second parameter subspace of constituent plant part parameters to constrain the simulation of the type of plant.

14. The system of claim 10, including instructions to detect one or more growth time intervals of the one or more structural features of the type of plant.

15. The system of claim 14, wherein the one or more structural features include one or more of leaves, flowers, branches, stems, fruit, or petioles.

16. The system of claim 14, wherein the one or more growth time intervals include time for a flower to develop into a fruit.

17. The system of claim 14, wherein the one or more growth time intervals include time for one of the structural features to grow from a first size to a second size.

18. The system of claim 10, wherein the digital imagery includes one or more videos, wherein each of the one or more videos captures a distinct instance of the type of plant.

19. A non-transitory computer-readable medium comprising instructions that, in response to execution of the instructions by a processor, cause the processor to:
  generate, using one or more machine learning models, an output to correspond to digital imagery that captures at a first time and a second time one or more of a type of plant, the output to include a first annotation and a second annotation, the first annotation to correspond to one or more structural features of the type of plant at the first time and the second annotation to correspond to the one or more structural features of the type of plant at the second time;
  extract a temporal feature from the first annotation and the second annotation based on a difference between the first annotation and the second annotation;
  identify a correlation between the extracted temporal feature and environmental data corresponding to the first time and the second time, wherein the environmental data is associated with one or more geographic areas in which the digital imagery was captured, wherein the correlation is determined based on a mapping between the environmental data and the extracted temporal feature;
  generate a first parameter subspace based on the extracted temporal feature and the correlation, wherein a first parameter subspace embedding of the first parameter subspace includes a plant parameter corresponding to one or more extracted temporal features, the correlation, or the environmental data corresponding to the first time and the second time, wherein the first parameter subspace is part of a whole plant parameter space, and wherein the whole plant parameter space corresponds to a species of the type of plant and the first parameter subspace corresponds to the type of plant; and
  generate one or more three-dimensional (3D) growth models of the type of plant wherein the one or more 3D growth models learn the first parameter subspace embedding of the first parameter subspace to constrain a simulation of a growth of the type of plant, and wherein the generation of the one or more 3D growth models is based on selection of at least one plant parameter from the first parameter subspace.

20. The method of claim 1, wherein the generation of the one or more 3D growth models based on the selection of the at least one plant parameter from the first parameter subspace further includes processing the at least one plant parameter from the first parameter subspace using a time series machine learning model, wherein the time series machine learning model outputs a predicted dimension of a plant part of the type of plant.

* * * * *